United States Patent [19]

Koester

[11] Patent Number: 5,758,927
[45] Date of Patent: Jun. 2, 1998

[54] FRAMELESS DUMP TRAILER WITH OFFSET LEFT MECHANISM

[76] Inventor: Leon Koester, 5465 Oakwood Dr., Newburgh, Ind. 47630-2132

[21] Appl. No.: 895,340

[22] Filed: Jul. 16, 1997

Related U.S. Application Data

[63] Continuation of Ser. No. 602,081, Feb. 15, 1996, abandoned.

[51] Int. Cl.⁶ .................................................... B60P 01/18
[52] U.S. Cl. ................................. 298/22 AE; 298/20 A
[58] Field of Search ........................... 298/20 A, 22 AE

[56] References Cited

U.S. PATENT DOCUMENTS

| | | | |
|---|---|---|---|
| 2,775,480 | 12/1956 | Braswell et al. | 298/19 |
| 2,953,410 | 9/1960 | Chaney | 298/22 |
| 3,149,881 | 9/1964 | Felburn | 298/20 |
| 3,181,761 | 5/1965 | Bartlett | 298/20 |
| 3,355,043 | 11/1967 | Talbert. | |
| 4,954,039 | 9/1990 | Johnston et al. | 298/22 AE |
| 5,354,165 | 10/1994 | Booher | 414/498 |
| 5,460,431 | 10/1995 | McWilliams | 298/22 AE |
| 5,482,356 | 1/1996 | Goodson, Jr. | 298/22 AE |

FOREIGN PATENT DOCUMENTS

| | | | |
|---|---|---|---|
| 2383042 | 10/1978 | France. | |
| 832479 | 4/1960 | United Kingdom. | |
| 1199274 | 7/1970 | United Kingdom | 298/20 AE |

*Primary Examiner*—Janice L. Krizek
*Attorney, Agent, or Firm*—Woodard, Emhardt, Naughton Moriarty & McNett

[57] ABSTRACT

A truck for transporting and dumping a load which includes a vehicle with a fifth wheel configured to pivot about a horizontal first axis from a first extreme to a second extreme. A dump trailer hitched to the fifth wheel includes an elongate load bed. The trailer also includes a hitch base for coupling the trailer to the fifth wheel, an arm pivotally linking the hitch base and bed, and a load bearing lift mechanism. A lift mechanism selectively tilts the trailer bed to dump a load. The lift mechanism has an upper end portion connected to the bed and a lower end portion pivotally connected to the hitch base. The lower end portion is configured to pivot about a second axis generally parallel to the first axis. The second axis is horizontally displaced from the first axis so that loading of the fifth wheel by the trailer substantially maintains the fifth wheel in one of the first and second extremes during dumping and avoids the need to lock the fifth wheel during transport.

14 Claims, 6 Drawing Sheets

FRAMELESS DUMP TRAILER WITH OFFSET LEFT MECHANISM

This application is a continuation of application Ser. No. 08/602,081, filed Feb. 15, 1996, now abandoned.

BACKGROUND OF THE INVENTION

A. Field of the Invention

The present invention relates to frameless dump trailers, and more particularly relates to coupling a frameless dump trailer to a fifth wheel of a tractor.

B. Description of the Prior Art

Trailers used to transport loads which may be tilted by raising the front end and dumping the contents out of the rear end by the force of gravity are well known. These trailers are typically attached to tractors or other vehicles to haul the trailer and accompanying load. Frequently, this attachment is provided by a fifth wheel hitch. In certain constructions, dump trailers have a rigid underlying support frame which retains stationary during the dumping process. One drawback of this arrangement is a reduced effective carrying capacity due to the excessive weight added by the support frame. Consequently, frameless dump trailers have been designed to overcome this disadvantage.

Figure 1:
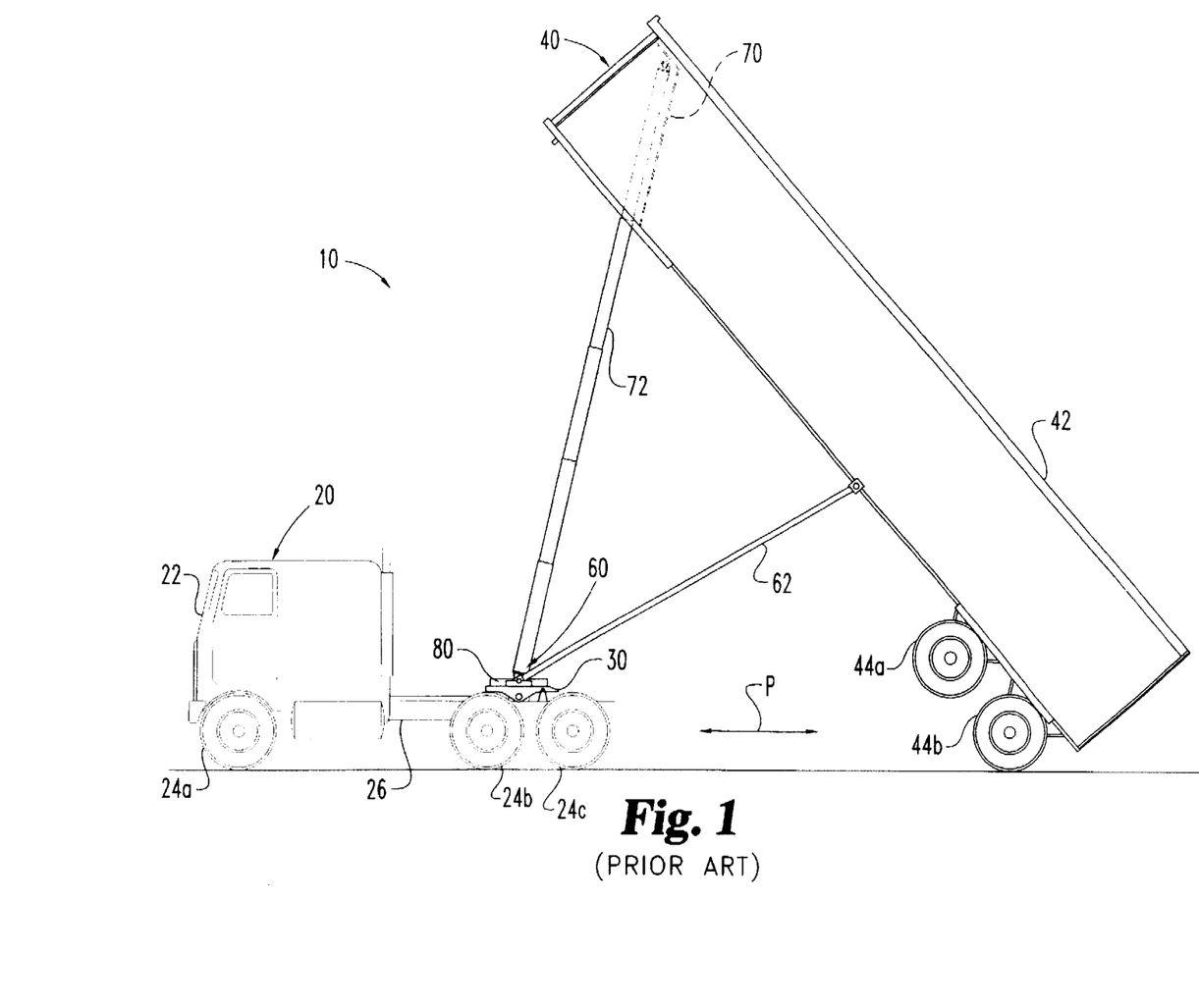
FIG. 1 is an elevational side view of a prior art truck with the frameless dump trailer in the tilted position.

FIG. 1 shows truck 10 having frameless dump trailer 40 with load compartment 42 in the tilted dumping position. Dump trailer 40 is coupled to tractor 20 having cab 22. Notably, as load compartment 42 is raised, wheels 24a, 24b, 24c of tractor 20 and wheels 44a, 44b move closer to each other along path P. Similarly, as load compartment 42 is lowered to a generally horizontal transport position (not shown), wheels 24a, 24b, 24c and 44a, 44b move away from each other.

Hitch assembly 60 couples dump trailer 40 to tractor 20. Hitch assembly 60 includes draft arm 62 and telescoping hydraulic cylinder 72 both pivotably linking load compartment 42 to hitch base member 80. One end of hydraulic cylinder 72 is partially housed in housing 70.

Figure 2:
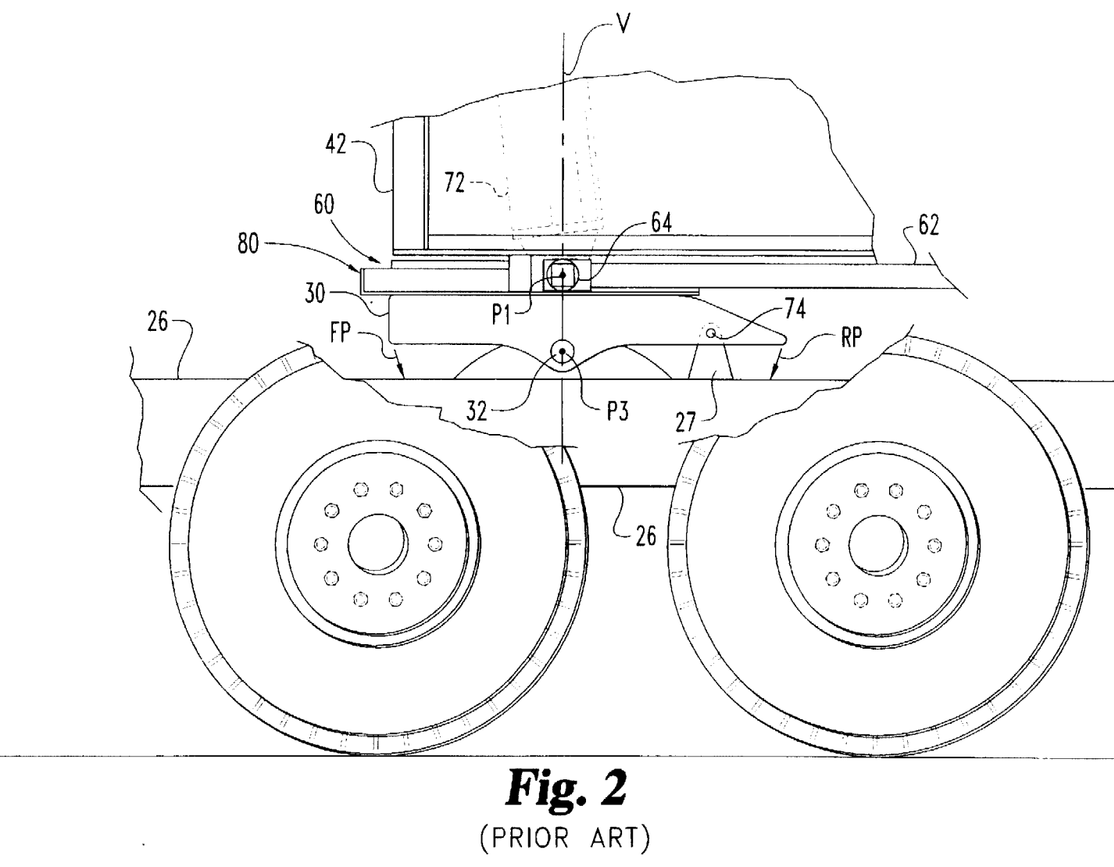
FIG. 2 is a partial side view of a hitch assembly shown in FIG. 1.

Referring additionally to FIG. 2, a partial side view of hitch assembly 60 and fifth wheel 30 is shown in an approximately level transport position. Fifth wheel 30 is of a conventional design configured for use with various types of trailers. Fifth wheel 30 is mounted to frame 26 of tractor 20 by pin 32 and is configured to pivot about a generally horizontal axis along pin 32. This pivot axis is approximately perpendicular to the view plane of FIG. 2 and is schematically represented by pivot point P3. Pivot Point P3 permits flexing of truck 10 as it travels over changing gradients. This flexure generally relieves various stresses that would otherwise threaten the integrity of the truck structure.

Draft arm 62 is pivotably connected by pin 64 to hitch base 80. This pivotable connection has a generally horizontal pivot axis which is approximately perpendicular to the view plane of FIG. 2 as represented by pivot point P1. Similarly, hydraulic cylinder 72 is also pivotably mounted to hitch base 80 to generally pivot about pivot point P1. Generally, hydraulic cylinder 72 bears a substantial load from dump trailer 40 in both the dumping and transport positions.

Pivot points P1 and P3 are generally parallel to each other and are aligned along a substantially vertical axis V. However, this arrangement may become unstable during normal transport and dumping operations because minor disturbances will cause fifth wheel 30 to rock back and forth between a forwardmost tilted position and a rearmost tilted position, along paths FP and RP as fifth wheel 30 pivots about axis P3. The generally horizontal forces associated with braking and accelerating are typically enough to cause rocking of fifth wheel 30 back and forth along paths FP, RP. Generally, this instability makes driving difficult, presents a risk of damage to the truck's structure, and poses a safety hazard.

One solution to this problem has been to block or lock the fifth wheel in a generally level position whenever a frameless dump tractor is hitched thereto. Referring to FIG. 2, block 27 is rigidly attached to frame 26 and defines a bore aligned with a bore in fifth wheel 30. Pin 74 protrudes through these aligned bores to provide one way of locking the fifth wheel in a generally level position. Similarly, appropriately sized blocks may be placed under the fifth wheel at the front and rear ends to prevent horizontal pivoting. In a locked or blocked configuration, unstable horizontal pivoting of fifth wheel 30 is avoided. Instead, flexing is generally provided by pivot point P1 of the hydraulic cylinder connection to hitch assembly 60. Unfortunately, this approach usually requires extra steps to be performed whenever alternating between a frameless dump trailer and a standard type of trailer which benefits from the pivoting capability of the fifth wheel. Furthermore, this configuration generally raises the effective center of gravity of trailer 40, often adversely impacting ride quality and handling of truck 10.

Another drawback with existing frameless dump trailer designs is that certain types of materials, such as clay, wet sands, or limestone, sometimes stick or clog during dumping. Additionally, in cold conditions, wet materials tend to stick or clog as they become frozen. In order to overcome these problems, a number of measures may be taken. The clogged materials may manually be dislodged from the trailer, although this requires additional labor and is time consuming. The trailer may be tilted farther than normal from the horizontal position to encourage the materials to become dislodged. While this is sometimes successful, it requires extra time and expense to tilt the trailer past its normal dumping angle. Additionally, when the trailer is tilted, it is at risk of becoming unstable because the materials that are clogging the trailer may be off-center.

Others have addressed this problem in the past. U.S. Pat. No. 1,627,336 to Nelson and U.S. Pat. No. 1,989,125 to Atwell provide a dumping trailer that is wider at the rear than at the front to encourage material removal by gravity. U.S. Pat. No. 4,883,321 to Voight and U.S. Pat. No. 5,090,773 to Guillaume provide a polygonal floor and side walls to facilitate material removal. U.S. Pat. No. 5,460,431 to McWilliams discloses a tapered floor from front to rear with obtuse angled side walls to encourage dumping by the force of gravity. However, the angular corners present in these designs still provide an opportunity for materials to catch or clog.

Thus, a need remains to provide for automatic locking of a fifth wheel when hitched to a frameless dump trailer. Preferably, the frameless dump trailer should be designed to facilitate the safe and swift removal of materials from a load compartment during dumping.

SUMMARY OF THE INVENTION

One aspect of the present invention is a frameless dump trailer system which stabilizes the fifth wheel hitch by horizontally offsetting the load bearing lift mechanism from the fifth wheel pivot point. Generally, this system avoids the need to lock or block the fifth wheel during dumping and transport.

Another aspect of the present invention is a truck for transporting and dumping a load that includes a vehicle with a fifth wheel. The fifth wheel is configured to pivot about a horizontal first axis over a range from a first extreme to a second extreme. A dump trailer is coupled to the vehicle which includes an elongated load bed coupled to a number of ground engaging wheels for carrying the load, a hitch base coupled to the fifth wheel, an arm pivotally linking the hitch base and the bed, and a load bearing lift mechanism. The lift mechanism has an upper end portion connected to the bed and a lower end portion pivotally connected to the hitch base. The lower end portion is configured to pivot about a second axis generally parallel to the first axis. The lift mechanism is selectively extendable to tilt the bed for dumping the load. Also, the second axis is horizontally displaced from the first axis so that loading of the fifth wheel by the trailer substantially maintains the fifth wheel in one of the first and second extremes when the trailer is hitched to the vehicle and in the dumping position.

Still another aspect of the present invention is a frameless dump trailer with a load compartment along a longitudinal axis. The load compartment is coupled to a number of ground engaging wheels and has a front portion opposing a rear portion. The rear portion defines a dumping outlet. The trailer also includes a hitch member with a king pin depending therefrom. The king pin is configured for hitching the trailer to a conventional tractor fifth wheel. An arm pivotally links the hitch member and the load compartment. Also, a load bearing lift mechanism pivotally links the compartment and the hitch member. The lift mechanism is selectively extendable to tilt the load compartment to dump the load. The lift mechanism is connected to the hitch member a horizontal distance from the king pin sufficient to provide stable pivoting of the fifth wheel when the trailer is hitched to the fifth wheel in a transport position.

In addition, the load compartment may be configured with a concave arcuate floor connecting opposing side walls. The opposing side walls are generally vertical and extend between the front and rear portions of the load compartment. This concave floor has a generally downward slope from the walls to a longitudinal midline. This configuration defines a load chamber with a substantially U-shaped cross section. Generally, this interior chamber shape promotes dislodgment and maintains centering of materials during dumping.

A further aspect of the present invention is a hitch apparatus configured for coupling a draft arm and lift cylinder of a dump trailer to a fifth wheel of a tractor. The apparatus includes a rigid bearing member configured for positioning between the dump trailer and the fifth wheel. The bearing member has a top surface for bearing contact with the dump trailer, a bottom surface for bearing contact with the fifth wheel, and a pair of opposing sides. A king pin depends from the bottom surface, which is configured to hitch to the fifth wheel. At least one of the pair of opposing sides has a draft arm connection portion with a draft arm journal bearing for pivotal connection of the draft arm thereto. Furthermore, the bearing member has a lift cylinder connection portion defined by the top surface. The lift cylinder connection portion has a lift cylinder journal bearing for pivotal connection of the lift cylinder. The lift cylinder connection portion is horizontally displaced from the king pin by a distance sufficient to avoid locking the fifth wheel when the hitch apparatus couples the dump trailer and tractor together.

Accordingly, one object of the present invention is to provide a truck with a frameless dump trailer which does not require a fifth wheel to be locked or blocked for stable transport and dumping.

Another object is to provide for easier dislodgment of a load from a frameless dump trailer during dumping.

Further objects, features, and advantages of the present invention shall become apparent from the detailed drawings and descriptions provided herein.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, any alterations and further modifications in the illustrated device, and any further applications of the principles of the invention as illustrated therein being contemplated as would normally occur to one skilled in the art to which the invention relates.

Figure 3:
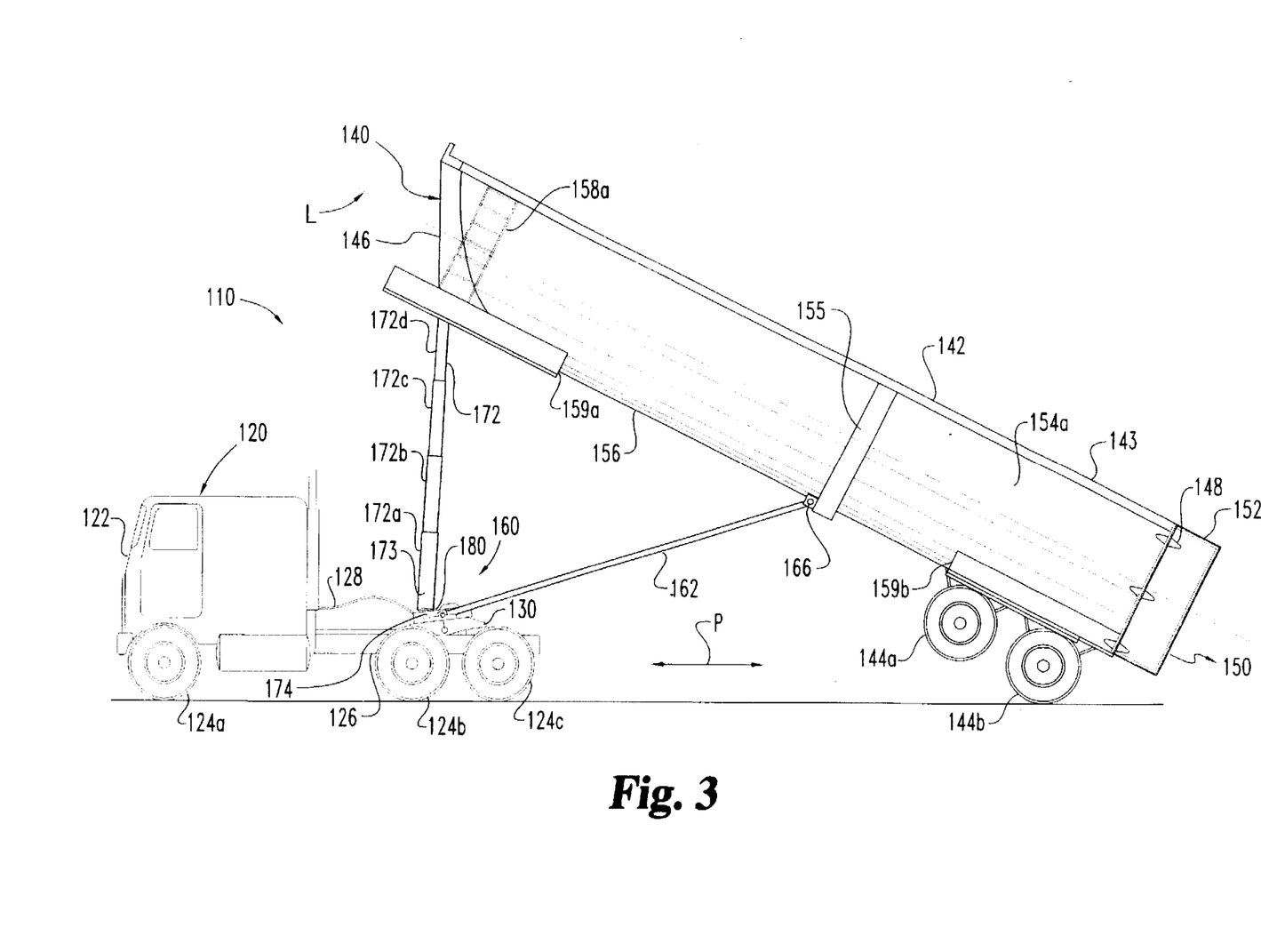
FIG. 3 is an elevational side view of a truck of one preferred embodiment of the present invention.

FIG. 3 depicts truck 110 of the present invention. Truck 110 includes tractor 120 coupled to frameless dump trailer 140 with hitch assembly 160. Tractor 120 is a tandem axle configuration with cab 122 attached to carrying frame 126. Tractor 120 has a number of ground engaging wheels 124a, 124b, 124c. Tractor 120 includes fifth wheel 130 for hitching to variously configured trailers. Umbilical 128 schematically represents various control couplings.

Frameless dump trailer 140 includes load compartment 142 defining load chamber 143 and having a length along longitudinal axis L. Dump trailer 140 is coupled to ground engaging wheels 144a, 144b in a tandem configuration.

Load compartment 142 is generally made of a metal such as aluminum or steel, and is configured to haul a load. Load compartment 142 has front end portion 146 opposing rear end portion 148. Rear end portion 148 defines dumping outlet 150 with a pair of doors pivotable about a generally vertical axis in opposing directions to provide dumping gate 152. Alternatively, a two-way gate which provides a horizontally pivoting door may be used.

Figure 4:
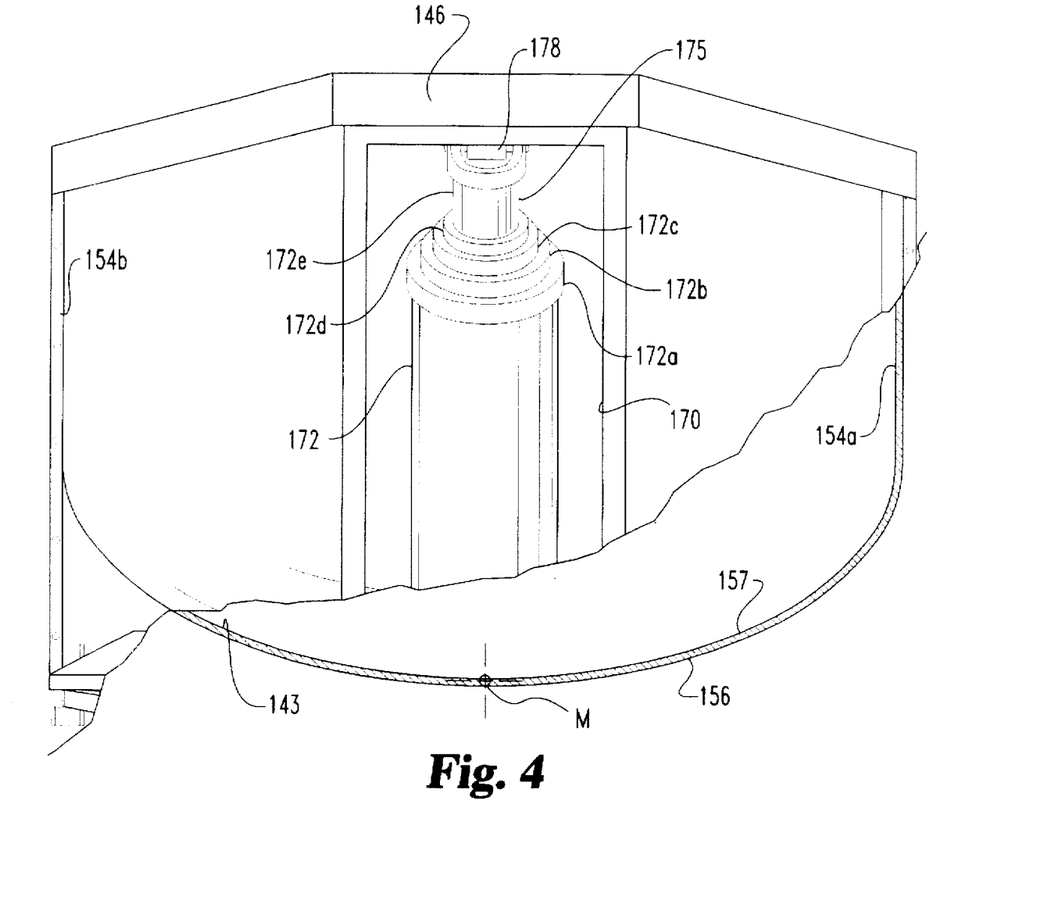
FIG. 4 is a partial cutaway front view of the dump trailer of the embodiment shown in FIG. 3.

Referring additionally to FIG. 4, a partial cutaway front view of dump trailer 140 is shown. Load compartment 142 includes generally vertical opposing side walls 154a, 154b extending along axis L between front end portion 146 and rear end portion 148. Each opposing side wall 154a, 154b is generally parallel to axis L. Side walls 154a, 154b are reinforced between front end portion 146 and rear end portion 148 by rib 155 and are joined together by bed 156.

Bed 156 has an elongated barrel shape with concave floor 157. Floor 157 generally slopes downward from walls 154a, 154b to a longitudinal midline between side walls 154a, 154b and parallel to axis L. This longitudinal midline is generally perpendicular to the view plane of FIG. 4, and is depicted by point M. A cross-section of load compartment 142 along axis L and between front end portion 146 and rear end portion 148 is generally U-shaped. In one embodiment, floor 157 joins side walls 154a, 154b with a simple curvature having a single bend radius. In another embodiment, floor 157 includes a complex curvature with multiple bend radii. In still other embodiments, floor 157 is generally flat, angular, or rectilinear in cross-section. Other features of load compartment 142 include ladder 158a and fenders 159a, 159b.

Hitch assembly 160 includes draft arm 162 and lift mechanism 172 pivotably linking load compartment 142 to hitch base member 180. Draft arm 162 is pivotably connected to load compartment 142 by pin 166 which is journaled to rib 155. Rib 155 reinforces load compartment 142 to better distribute stresses associated with the pivotable connection at pin 166. Generally, draft arm 162 is rigidly formed from a metallic material such as steel or aluminum.

Load bearing lift mechanism 172 has lower end 173 pivotably connected to base member 180 by pin 174. Lift mechanism 172 also has an upper end 175 pivotably connected to front end portion 146 of load compartment 142 by pin 178. Lift mechanism 172 is generally configured to continuously bear a load from dump trailer 140 via pin 178. Furthermore, lift mechanism 172 generally transmits this load along its length to pin 174.

Lift mechanism 172 includes a shaft with telescoping segments 172a, 172b, 172c, 172d and 172e which move relative to each other in a reciprocating fashion to provide the extended dumping position shown in FIG. 3. Similarly, telescoping segments 172a–172e may be selectively moved to a nested position to provide the generally horizontal transport position depicted in FIG. 4. In either case, lift mechanism 172 is partially enclosed by housing 170 at front end portion 146 of load compartment 142. Preferably, load bearing lift mechanism 172 is a telescoping hydraulic cylinder controlled by an operator via umbilical 128. In other embodiments, lift mechanism 172 may be an electromechanical, pneumatic, or other lifting assembly as would occur to one skilled in the art.

Figure 5:
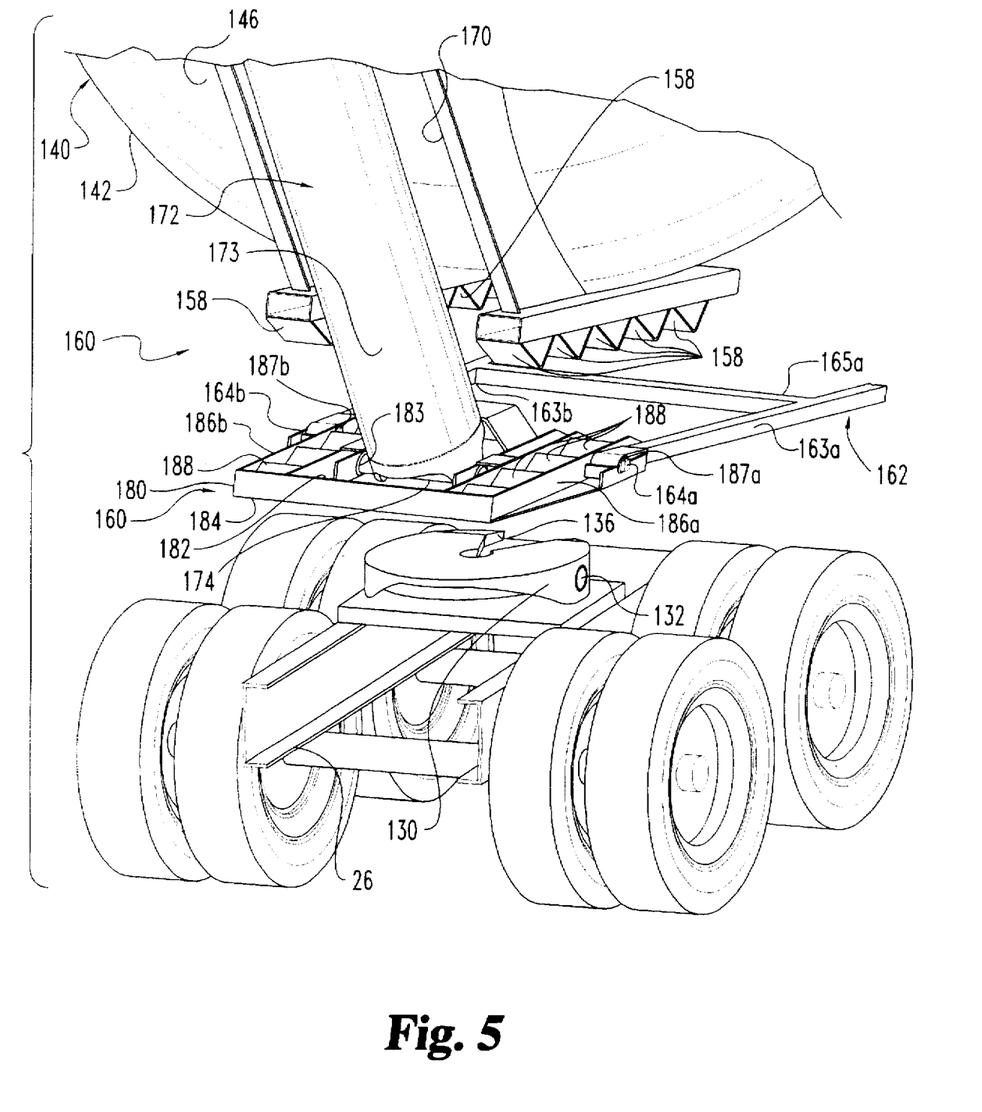
FIG. 5 is an exploded, partial perspective view of the embodiment shown in FIG. 3.
Figure 6:
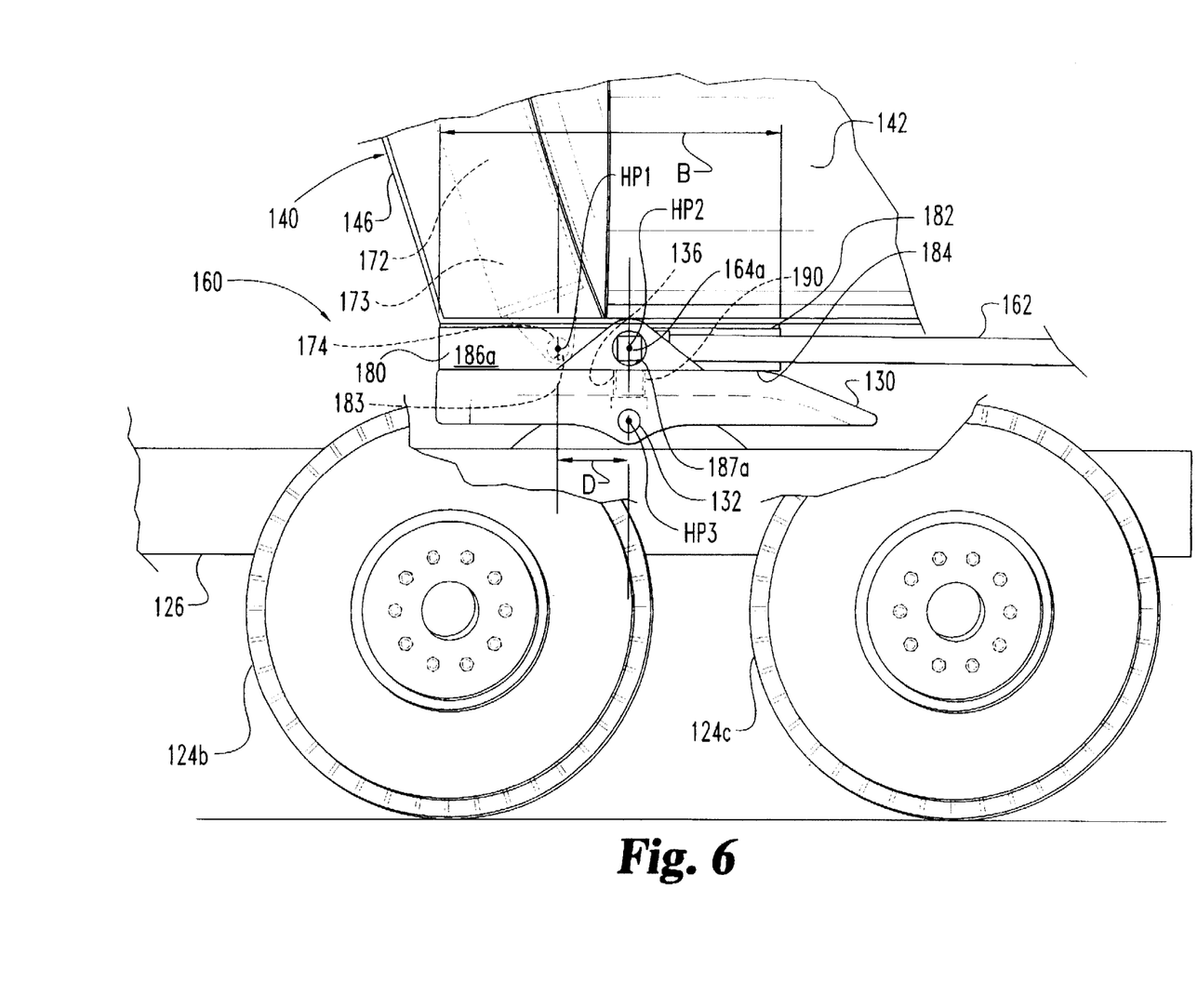
FIG. 6 is a partial elevational side view of the embodiment shown in FIG. 3.

Additionally referring to FIGS. 5 and 6, further details concerning hitch assembly 160 are illustrated. Base member 180 has top surface 182 opposing bottom surface 184 and joined by opposing sides 186a, 186b. Arm 162 has opposing prongs 163a, 163b each pivotably connected to base member 180 with a corresponding pin 164a, 164b to pivot about a generally horizontal axis represented by pivot point HP2. Cross brace 165a joins prongs 163a, 163b to form a yoke configuration. A similar yoke configuration may be used to pivotally connect to opposing sides of load compartment 142 at rib 155. Each pin 164a, 164b is supported by journal bearings 187a, 187b formed in corresponding opposing sides 186a, 186b of base member 180. In other configurations a simple arm without a yoke may be used.

Pin 174 connects lower end 173 of lift mechanism 172 to pivot about a generally horizontal axis which is generally perpendicular to the view plane of FIG. 6 as represented by pivot point HP1. Pin 174 is supported by journal bearing 183 defined by top surface 182 of base member 180. Top surface 182 further defines a number of depressions or recesses 188 configured to mate with projections 158 of load compartment 142 when dump trailer 140 is in the transport position.

Referring specifically to FIG. 6, base member 180 has contact length B with fifth wheel 130. Preferably, base member 180 is rigid and made from a metal such as steel or aluminum, and is configured to serve as a bearing member for placement between load compartment 142 and fifth wheel 130. Bottom surface 184 of base member 180 also includes king pin 190 depending therefrom. King pin 190 protrudes through opening 136 of fifth wheel 130 to hitch dump trailer 140 to tractor 120. Fifth wheel 130 is coupled to frame 126 by pin 132 to pivot about a generally horizontal axis approximately perpendicular to the view plane of FIG. 6 as represented by pivot point HP3. The pivot axes represented by pivot points HP1, HP2, HP3 are generally parallel to each other. Notably the horizontal pivot axis of fifth wheel 130 is horizontally displaced from the pivot axis of lift mechanism 172 by a distance D when dump trailer 140 and tractor 120 are hitched together. Because king pin 190 is generally vertically aligned with pin 132, distance D also approximates the horizontal distance separating king pin 190 from pin 174.

Next, various operational aspects of truck 110 are discussed. One operation provided by truck 110 is a controllable dumping feature. Truck 110 is shown in one dumping position in FIG. 3. To dump a load, telescoping segments 172a–172e of lift mechanism 172 are moved from a retracted or nested position in housing 170 to an extended position which tilts load compartment 142. Both lift mechanism 172 and draft arm 162 pivot about HP1 and HP2 and connection pins 178, 166, respectively, during extension. To return to the transport position, the telescoping segments retract into the position shown in FIGS. 4 and 6. Preferably, the lift mechanism extension and retraction is performed hydraulically under the control of an operator.

A further operational aspect associated with the dumping feature is that dislodgment is generally enhanced by the shape of load chamber 143. Specifically, the arcuate concave floor 157 slopes downward from opposing side walls 154a, 154b to longitudinal midline M. Generally, the downward slope decreases as midline M is approached. This shape tends to center a load as it is being dumped which prevents uneven loading forces on dump trailer 140. Furthermore, the curvature of floor 157 avoids corners and similar discontinuities which tend to catch some load materials.

Substantially vertical side walls 154a, 154b generally increase the load carrying volume of load compartment 142 without significantly impacting the load dislodgment capability. The smooth arcuate transition from opposing side walls 154a, 154b to arcuate concave floor 157 typically enhances load dislodgment. Also, the shape of chamber 143 generally provides a strong and rigid construct for supporting the load during transport.

Another operational aspect of truck 110 when in the dumping position is that the load transmitted by lift mechanism 172 to fifth wheel 130 biases fifth wheel 130 into the forwardmost tilt position as depicted in FIG. 3. As a result, truck 110 does not generally require blocking or locking of fifth wheel 130 to perform the dumping operation.

Among the reasons for this biasing is the degree of horizontal displacement of the lift mechanism pivot point HP1 from the fifth wheel pivot point HP3. The horizontal displacement of HP1 from HP3 also contributes to the stabilization of fifth wheel 130 during transport. Indeed, fifth wheel 130 typically provides truck 110 the horizontal pivoting needed to accommodate changing road gradients without the need for special adjustment. Consequently, blocking or locking of fifth wheel 130 is not required during transport either.

Because HP3 is lower than HP1, using HP3 to provide horizontal pivoting lowers the effective center of gravity of dump trailer 140. This effective lower center of gravity typically improves handling and ride quality of truck 110.

Preferably, distance D is selected to assure fifth wheel 130 does not substantially pivot about HP3 during dumping. Also, displacement distance D should be selected to prevent substantial pivoting of fifth wheel 130 in response to driving conditions which create minor horizontal disturbances—such as braking and accelerating. However, it is preferred that distance D not be so great as to significantly hamper the stable pivoting of fifth wheel 130 in response to changing road gradients or otherwise introduce handling problems. Generally, it is preferred that distance D be in a range of about 1 to 24 inches. More preferably, distance D is between about 2 and 12 inches, and even more preferably distance D is between about 4 and 8 inches. Most preferably, distance D is about 6 inches.

Notably, when returning from the dumping position to the transport position, the generally triangular shaped projections 158 and corresponding mounting recesses 188 provide a way to assure proper alignment of load compartment 142 with base member 180. Furthermore, the design of projections 158 and mating recesses 188 assure that wearing will be generally even.

It is also preferred that contact length B of base member 180 be at least as long as the bearing surface of fifth wheel 130 contacted by bottom surface 184. For a conventional fifth wheel, it is preferred that B be at least 30 inches. Typically, an expansive bearing contact between dump trailer 140 and fifth wheel 130 enhances stability of truck 110 and the interface between trailer 140 and fifth wheel 130. Because the orientation of the king pin 190 depending from base member 180 dictates relative positioning of trailer 140 with respect to the fifth wheel 130 when hitched thereto, distance D is generally determined by configuring base member 180 with a corresponding distance separating the pivotable connection site of lift mechanism 172 from king pin 190. For the configuration of base member 180 as shown in FIG. 6, the hitched king pin 190 is generally aligned with P3 so that distance D is about the same as the horizontal separation of lift mechanism 172 from king pin 190.

In an alternative embodiment, the horizontal distance separating the king pin from the lift member and the horizontal distance separating the lift member from the horizontal pivot point of the fifth wheel differ. For this embodiment, the king pin and lift mechanism connection are accordingly spaced to provide a selected offset of the lift mechanism from the fifth wheel pivot point. In other embodiments, hitch assembly 160 may be configured to pivotably link lift mechanism 172 so that a conventional fifth wheel is prevented from substantial horizontal pivoting by being fixed in a rearmost tilt position during dumping.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A trailer fifth wheel hitch apparatus for connecting a frameless dump trailer with a draft arm to a conventional tractor fifth wheel, wherein the tractor fifth wheel pivots about a horizontal tractor pivot axis A1; the trailer fifth wheel hitch apparatus comprising:

(a) a base plate member for attaching the trailer to a tractor fifth wheel, said base plate member having a king pin depending therefrom, the base plate member engageable with the fifth wheel to tilt therewith about axis A1, wherein said base plate member is free to tilt forward sufficiently to deviate from a substantially horizontal orientation;

(b) a draft arm connection mounted to said base plate member for pivotal connection of the draft arm to the base plate member; and (c) a lift cylinder connection mounted to said base plate member for pivotal connection of a lift cylinder to the base plate member, said lift cylinder connection defining a lift cylinder pivot axis A2 where the lift cylinder pivots with respect to the base plate member;

wherein said lift cylinder pivot axis A2 is horizontally offset from tractor pivot axis A1.

2. A dump trailer for coupling to a vehicle with a fifth wheel, said fifth wheel being configured to pivot about a generally horizontal first axis from a first extreme to a second extreme;

said dump trailer comprising:
   an elongate load bed coupled to a number of ground engaging wheels for carrying the load,
   a hitch base hitched to said fifth wheel,
   an arm pivotally linking said hitch base and said bed, and
   a load bearing lift mechanism having an upper end portion connected to said bed and a lower end portion pivotally connected to said hitch base, said lower end portion being configured to pivot about a second axis generally parallel to the first axis, said lift mechanism being selectively extendable to tilt said bed for dumping the load;

wherein the second axis is horizontally displaced from the first axis so that loading of said fifth wheel by said trailer substantially maintains said fifth wheel in one of the first and second extremes when said trailer is in a dumping position, and said fifth wheel and said hitch base are configured so that said hitch base is free to tilt forward sufficiently to deviate from a substantially horizontal orientation.

3. The trailer of claim 2, further comprising a pair of opposing side walls attached to said bed, said pair of opposing side walls being generally vertical; and, wherein said bed has an arcuate concave floor generally sloping downward from said pair of opposing side walls toward a longitudinal midline.

4. The trailer of claim 2, wherein said first extreme is a forwardmost tilt position and said trailer substantially maintains said fifth wheel in the first extreme when said trailer is in said dumping position.

5. The trailer of claim 2, wherein said arm has a first end portion pivotally connected to said bed and a second end portion opposing said first end portion, said second end portion has a pair of connection prongs, and said hitch base includes:

a rigid bearing member positioned between the dump trailer and the fifth wheel, said bearing member having a top surface opposing a bottom surface, and a pair of opposing sides;

a king pin depending from said bottom bearing surface, said king pin being configured to hitch to said fifth wheel;

an arm connection portion configured with a pair of prong journal bearings correspondingly supporting each of said pair of connection prongs; and a lift mechanism connection portion defined by said top surface, said lift mechanism connection portion having a lift mechanism journal bearing supporting said lift mechanism.

6. The trailer of claim 2, wherein said lift mechanism includes:

a hydraulic cylinder with a number of linked telescoping segments, said number of linked telescoping segments being hydraulically moveable relative to each other to extend said lift mechanism;

a first pin journaling said lower end portion to said hitch base; and a second pin journaling said upper end portion to said bed.

7. The trailer of claim 2, wherein the second axis is horizontally displaced from the first axis by a distance of between about 4 inches and about 12 inches.

8. The trailer of claim 7, wherein the second axis is horizontally displaced from the first axis by a distance of about 6 inches.

9. The trailer of claim 2, wherein said load bed includes:

a pair of opposing side walls extending from said front end portion to said rear end portion, said pair of opposing side walls being generally vertical; and a concave floor with a curvature generally sloping downward from said pair of opposing side walls toward a longitudinal midline, said load bed having a generally U-shaped cross section along a plane intersecting the longitudinal midline.

10. The trailer of claim 2, wherein said arm has an end portion with a pair of opposing connection prongs, and said hitch base includes:

a rigid bearing member positioned between the dump trailer and the fifth wheel, said bearing member having a top surface for contacting said bed, a bottom surface for contacting the fifth wheel, and a pair of opposing sides;

an arm connection portion configured with a pair of prong journal bearings each supporting a corresponding one of said pair of connection prongs; and a lift mechanism connection portion defined by said top surface, said lift mechanism connection portion having a lift mechanism journal bearing supporting said lift mechanism.

11. The trailer of claim 2, wherein the second axis is horizontally displaced from the first axis by a distance of between about 4 inches and about 12 inches.

12. The trailer of claim 2, wherein the second axis is horizontally displaced from the first axis by a distance of about 6 inches.

13. The trailer of claim 2, wherein one of said load bed and said hitch base define a plurality of recesses and another of said load bed and said hitch base define a plurality of projections configured to engage the recesses when the trailer is in a transport position.

14. The trailer of claim 2, wherein said load bed forms a continuous load bearing relationship with said hitch base.

\* \* \* \* \*